United States Patent [19]
Zilberman et al.

[11] 3,923,535
[45] Dec. 2, 1975

[54] HEAT INSULATING MATERIAL

[76] Inventors: Leonid Borisovich Zilberman, Ekonomicheskaya ulitsa, 1a, kv. 12; Semen Borisovich Krakhmalnikov, ulitsa Korolenko, 18, kv. 17; Gennady Alexandrovich Kudinov, prospekt Gagarina, 8 mikroraion, 32, kv. 203; Dorina Borisovna Kutsykovich, prospekt Lenina, 39, kv. 54, all of Kharkov; Jury Gavrilovich Moiseev, Donetskoi oblasti, ulitsa Ilicha, 138, kv. 5, Zhdanov; Abram Mikhailovich Shneider, ulitsa Artema, 17, kv. 16, Kharkov, all of U.S.S.R.

[22] Filed: Aug. 8, 1974

[21] Appl. No.: 495,908

Related U.S. Application Data

[63] Continuation of Ser. No. 269,805, July 7, 1972, abandoned.

[52] U.S. Cl. .................................. 106/84; 106/117

[51] Int. Cl.² .......................................... C04B 35/68
[58] Field of Search.................... 106/68, 84, 117

[56] References Cited
UNITED STATES PATENTS

| | | | |
|---|---|---|---|
| 2,162,387 | 6/1939 | Radabaugh | 106/84 |
| 2,656,281 | 10/1953 | Wasserman | 106/84 |
| 3,508,936 | 4/1970 | Lyass et al. | 106/84 |

*Primary Examiner*—J. Poer
*Attorney, Agent, or Firm*—Holman & Stern

[57] ABSTRACT

A heat insulating material is disclosed comprising comprises powdery and liquid components in the following % by weight: sand 17–19, asbestos 8–10, ferrochromium slag 2–3, chamotte powder being the balance; liquid glass, 9–10, and water, 19–21% in addition to 100% of the powdery components; a foaming agent of the surface-active substance type, 0-5–1.0% in addition to 100% of the liquid components.

2 Claims, No Drawings

HEAT INSULATING MATERIAL

BACKGROUND OF THE INVENTION

This is a continuation of application Ser. No. 269,805, filed July 7, 1972, now abandoned.

The present invention relates to a heat insulating material and more particularly to a heat insulating material for filling up spaces between the cooling plates and the shell of a blast furnace. Such materials should be thermostable and gasproof.

At present the space between the shell of a blast furnace and the cooling plates is filled up with a heat insulating material having the following composition:

| | |
|---|---|
| marl (consisting of 80-84% of chamotte and 16-20% of clay) | 78-80% |
| constructional cement of 500-600 grade | 20-22% |
| water by weight of the dry components | 80-100%. |

However, the presence of a high percentage of water in the composition to ensure fluidity thereof leads to undesirable consequences. Water flows down between the cooling plates into the carbonaceous packing, the hearth and the hearth bottom blocks eroding them and forming voids, whereby molten cast iron is able to penetrate towards the shell.

Much time is also spent in drying and setting the material.

In addition, during drying of the material shrinkage takes place resulting in the formation of cracks through which hot gases penetrate to thereby overheat the shell.

The material being of a laminar structure, its heat insulating characteristics are non-uniform, whereby it does not comply with the requirements relating to heat conductance and gasproofing.

SUMMARY OF THE INVENTION

It is a primary object of the invention to provide a heat insulating material which exhibits low heat conductance.

It is another object of the invention to impart gasproofing properties to this heat insulating material.

Further no less important objects of the invention are to ensure fluidity, rapid setting, uniformity and elimination of shrinkage of the heat insulating material during the setting process.

DETAILED DESCRIPTION OF A PREFERRED EMBODIMENT

These objects are accomplished by the provision of a heat insulating material on the basis of chamotte comprising a powdery filler, a binding agent and a solvent containing according to the invention in % by weight:

| | |
|---|---|
| a filler comprising: | |
| river sand | 17-19 |
| asbestos | 8-10 |
| ferrochrome slag | 2-3 | chamotte being the balance;

a binding agent comprising liquid glass, 9-10% in addition to 100% by weight of the powdery components;

solvent comprising water used in addition to 100% by weight of the powdery components; and a foaming agent of the surface-active substance type, 0.5-1.0%, in addition to 100% by weight of the liquid components.

The heat insulating material of this composition exhibits higher gasproofing capacity and lower heat conductance.

Better understanding of the invention may be had from the following description of the illustrative example of the material composition and methods of its preparation and use.

The heat insulating material is prepared from solid powdery components and liquid components used in the following quantities in % by weight:

| | |
|---|---|
| a filler comprising powdery components: | |
| river sand (without shells) | 17-19 |
| finely crushed asbestos | 8-10 |
| finely crushed ferrochrome slag | 2-3 | chamotte powder (a particle size up to 2 mm with up to 7% of 2 mm particles) being the balance.

Liquid components:

liquid glass as binding agent used in an amount of 9-10% in addition to 100% by weight wt.% of the powdery components;

water as solvent used in an amount of 19-21% in addition to 100 wt.% of the powdery components;

and a foaming agent, 0.5-1.0%, in addition to 100% by weight of the liquid components.

The foaming agent may comprise petroleum sulphonic acids obtained during the processing of kerosene or diesel-oil distillate with sulphuric anhydride. Naphthene soap may also be used which comprises sodium soaps of water-insoluble organic acids extracted from the wastes of alkaline purification of kerosene, gasoil and solar-oil distillates of mineral oil.

The above-mentioned components are mixed in a concrete mixer for 10-15 minutes to obtain a cream-like mixture. The resulting material exhibits fluidity sufficient to transport it along pipelines under a gauge pressure of 6-8 kgf/cm$^2$ e.g. by means of compressed air.

Since the material exhibits rapid setting it should be used quickly after the preparation (in 3-5 minutes) to fill up the spaces between the shell of a blast furnace and the cooling plates.

Upon filling up the spaces the heat insulating material sets in 0.5-1.5 hours and does not shrink during setting due to a low content of the liquid components.

The experiments have shown that the heat insulating material according to the invention has a required fluidity to ensure complete filling of the spaces, and sets rapidly.

Furthermore, the material according to the invention has uniform composition, exhibits low heat conductance and high gasproofing capacity.

The blast furnace of 2,000 m$^3$ capacity, where the abovedescribed heat insulating material was used, had a temperature of about 30°-40°C at the outer surface of the shell.

What is claimed is:

1. A heat insulating material comprising powdery and liquid components in % by weight: the powdery component being a filler having the following composition

| | |
|---|---|
| river sand | 17-19% by weight |
| asbestos | 8-10% by weight |

-continued ferrochrome slag    2–3% by weight with chamotte powder making up the balance; the liquid component being a binding agent comprising liquid glass, 9–10%, in addition to 100% of the powdery components, a solvent comprising water 19–21%, in addition to 100% of the powdery components, and a foaming agent of the surface-active substance type, 0.5–1.0% in addition to 100% of the liquid components.

2. The heat insulating material of claim 1 wherein said chamotte powder has a particle size of up to 2mm with up to 7% of 2mm particles.

* * * * *